United States Patent
Imamura et al.

(10) Patent No.: US 7,031,510 B2
(45) Date of Patent: Apr. 18, 2006

(54) REGION SEGMENTATION OF COLOR IMAGE

(75) Inventors: Atsushi Imamura, Kyoto (JP); Hiroshi Sano, Kyoto (JP); Junichi Shiomi, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 649 days.

(21) Appl. No.: 10/077,962

(22) Filed: Feb. 20, 2002

(65) Prior Publication Data

US 2002/0146167 A1  Oct. 10, 2002

(30) Foreign Application Priority Data

Feb. 28, 2001  (JP) ............................. 2001-054846

(51) Int. Cl.
*G06K 9/00*  (2006.01)

(52) U.S. Cl. ...................................... 382/147; 382/164

(58) Field of Classification Search ................ 382/141, 382/145, 147, 151, 162, 164, 165, 173, 199, 382/224, 225, 253, 282; 345/589, 592, 593, 345/601, 602, 619, 644; 358/3.23, 515, 528, 358/530

See application file for complete search history.

(56) References Cited

U.S. PATENT DOCUMENTS 5,263,095 A * 11/1993 Kitamura ................... 382/164
5,386,483 A *  1/1995 Shibazaki .................. 382/162
5,630,037 A *  5/1997 Schindler .................. 345/592
5,668,896 A *  9/1997 Kitamura et al. ........... 382/282
5,825,917 A * 10/1998 Suzuki ...................... 382/164
5,828,779 A * 10/1998 Maggioni .................. 382/165
6,021,221 A *  2/2000 Takaha ...................... 382/199

FOREIGN PATENT DOCUMENTS

JP      11-316193      11/1999

* cited by examiner

*Primary Examiner*—Andrew W. Johns
*Assistant Examiner*—Amir Alavi
(74) *Attorney, Agent, or Firm*—McDermott Will & Emery LLP

(57) ABSTRACT

A color image of a circuit board is divided into respective color regions. Plural representative colors are set, and angle indices and distance indices are calculated for each pixel color in the color image in a predetermined color space. The angle indices for a particular pixel color represent angles between an individual color vector representing the particular pixel color and plural representative color vectors of the plural representative colors. The distance indices for a particular pixel color represent distances between the particular pixel color and the plural representative colors. Composite distance indices are then calculated for each pixel color in the color image, based on the distance indices and the angle indices. Each pixel in the color image is classified into plural representative color regions associated with the plural representative colors according to the composite distance indices, thereby dividing the image region of the color image into the plural representative color regions.

20 Claims, 10 Drawing Sheets

GR {
GREEN REGION G1: BOARD BASE REGION COATED WITH RESIST (RESIST REGION WITH LOWER BRIGHTNESS)

GREEN REGION G2: COPPER WIRINGS REGION COATED WITH RESIST (RESIST REGION WITH HIGHER BRIGHTNESS)

GOLD REGION GL: REGION PLATED WITH GOLD

BROWN REGION BR: REGION OF BOARD BASE

WHITE REGION WH: REGION PRINTED WITH WHITE CHARACTERS

+ : SAMPLE POINT

FIRST DIVIDED REGION DR1 { GREEN REGION GR { G1
                                              G2

SECOND DIVIDED REGION DR2 { GOLD REGION GL
                            BROWN REGION BR

THIRD DIVIDED REGION DR3 { WHITE REGION WH

CLGR : GREEN CLUSTER      VGR : GREEN REPRESENTATIVE VECTOR
CLGL : GOLD CLUSTER       VGL : GOLD REPRESENTATIVE VECTOR
CLBR : BROWN CLUSTER      VBR : BROWN REPRESENTATIVE VECTOR
CLWH : WHITE CLUSTER      VWH : WHITE REPRESENTATIVE VECTOR

○ : REPRESENTATIVE COLOR

● : INDIVIDUAL COLOR

Fig. 8
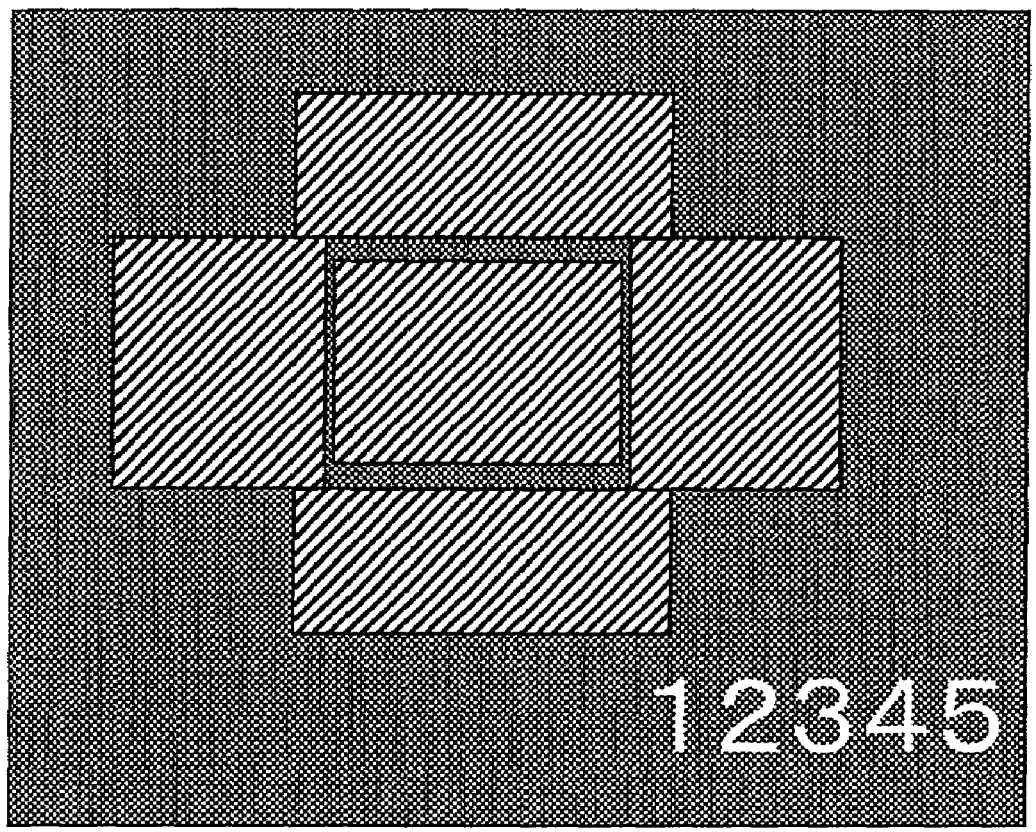
 : FIRST DIVIDED REGION DR1 (G1+G2)
 : SECOND DIVIDED REGION DR2 (GL+BR)
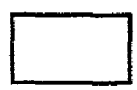 : THIRD DIVIDED REGION DR3 (WH)

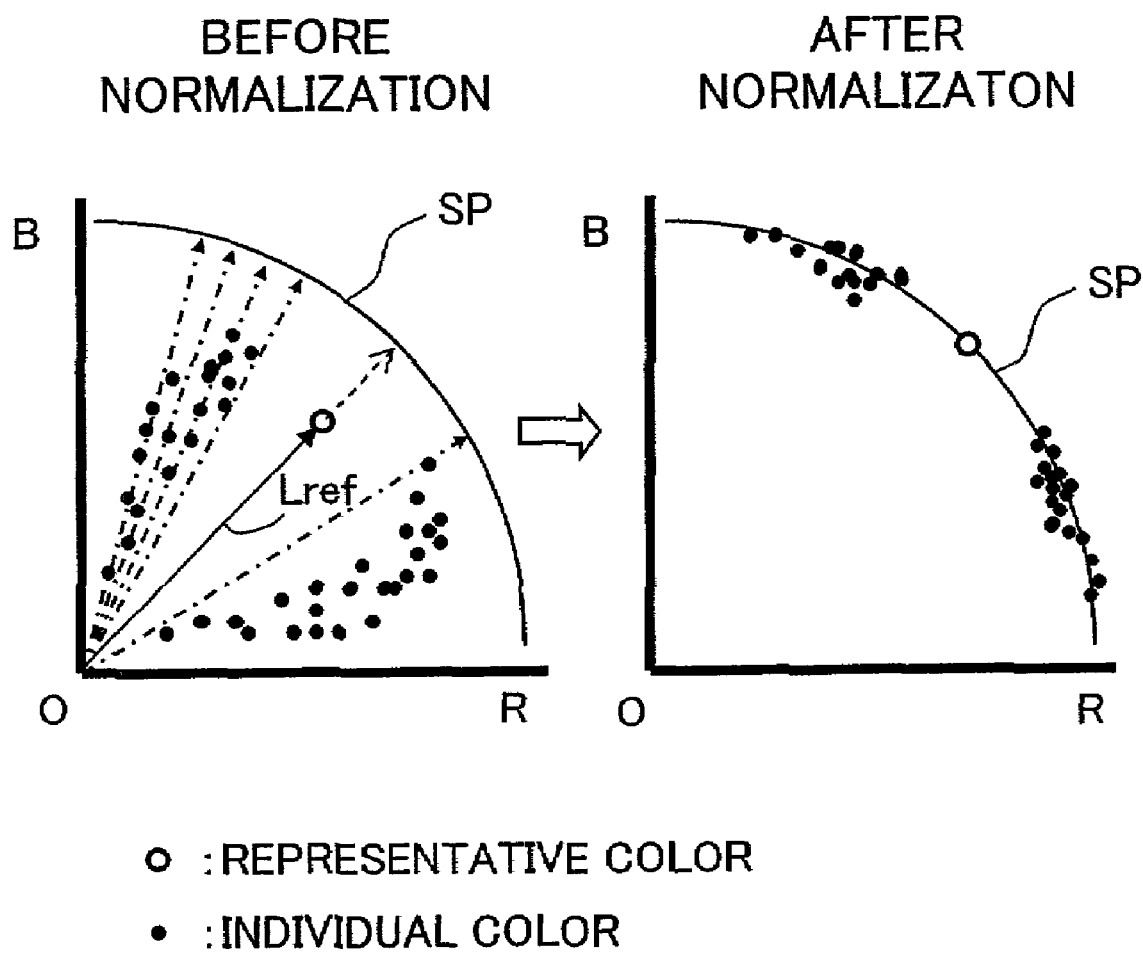

APPROPRIATE CLUSTERING

INAPPROPRIATE CLUSTERING

REGION SEGMENTATION OF COLOR IMAGE

DETAILED DESCRIPTION OF THE INVENTION

1. Field of the Invention

The present invention relates to a technique for dividing an image region of a color image according to colors.

2. Description of the Related Art

It is sometimes desired to divide an image region of a color image in order to selectively process a desired region of a specific color. FIGS. 10A and 10B illustrate conventional region dividing (also referred to as "region segmentation"). Initially in this method, colors of respective objects in a color picture are specified as a plurality of representative colors. Distances between each pixel color in the color image and the plural representative colors are then calculated in the RGB color space. Each pixel is then categorized into a cluster around a representative color that provides the smallest distance. The term "cluster" refers to a group of plural colors associated with one representative color. In this specification, process for categorizing an arbitrary color into one of the plural representative colors is also referred to as "clustering".

FIG. 10A illustrates the result of an appropriate clustering process. In this figure, a horizontal axis indicates R (red) component and a vertical axis indicates B (blue) component. Color of each pixel is represented in the three-dimensional RGB space in actual cases, but a two-dimensional space is used herein for convenience of illustration. Black dots represent colors of pixels (also referred to as "individual colors") in the color image, and larger open circles represent representative colors of respective objects. It is appreciated from the example of FIG. 10A that all pixel colors are appropriately grouped into objects 1–4.

Even if an object in a color image has uniform original color, the brightness values of pixel colors of the object may show a considerable dispersion depending on the illumination on the object. Specifically, colors with higher brightness are plotted distant from the origin of the RGB color space, and colors with lower brightness are plotted close to the origin. In such cases, dots representing pixel colors of the object will disperse in a wide range around a direction of the color vector that represents the original color of the object.

FIG. 10B illustrates the clustering result where pixel colors of object 1 and object 2 are dispersed in a wide range around the directions that connect their representative colors with the origin O, respectively. In this figure, dashed lines represent appropriate grouping of pixel dots, and solid lines represent inappropriate grouping actually performed.

Conventional techniques for region segmentation sometimes mistakenly recognize pixel colors that originally belong to a same object of a same color as colors of different objects because of their brightness dispersion. Such problem is particularly significant in region segmentation of a color picture of actual objects, as well as in region segmentation of a color image other than color picture.

SUMMARY OF THE INVENTION

Accordingly, an object of the present invention is to provide a technique that can divide a color image into appropriate color regions according to colors with less errors.

According to one aspect of the present invention, a color image is divided into appropriate color regions according to colors. Plural representative colors are set, and angle indices and distance indices are calculated for each pixel color in the color image in a predetermined color space of at least two dimensions. The angle indices for a particular pixel color represent angles between an individual color vector representing the particular pixel color and plural representative color vectors of the plural representative colors. The distance indices for a particular pixel color represent distances between the particular pixel color and the plural representative colors. Composite distance indices are then calculated for each pixel color in the color image, based on the distance indices and the angle indices. Each pixel in the color image is classified into plural representative color regions associated with the plural representative colors according to the composite distance indices, thereby dividing the image region of the color image into the plural representative color regions.

Since the region dividing is executed by using both the angle indices and the distance indices, the color image can be divided into appropriate regions according to colors with less errors than the conventional techniques.

In another aspect of the present invention, the composite indices are calculated for each arbitrary individual color in the color space. The correspondence between each arbitrary individual color and the plurality of representative colors are obtained in advance to form a lookup table storing the correspondence. Pixels in the color image are classified into plural representative color regions with the aid of the lookup table.

The present invention can be implemented in various embodiments, such as a method and an apparatus for dividing a color image region, a method and an apparatus for generating a mask by using the results of the region dividing, a method and an apparatus for inspecting a circuit board, a method and an apparatus for generating a lookup table to be used for the region dividing of a color image, a computer program for implementing the functions of these various methods or apparatuses, a computer program product or a recording medium having the computer program stored thereon, and data signals embodied in a carrier wave including the computer program.

These and other objects, features, aspects, and advantages of the present invention will become more apparent from the following detailed description of the preferred embodiments with the accompanying drawings.

BRIEF DESCRIPTION OF THE DRAWINGS

FIG. 8 shows plural divided regions.

FIGS. 9A and 9B show a color normalization process employed in a second embodiment.

DESCRIPTION OF THE PREFERRED EMBODIMENT

Figure 1:
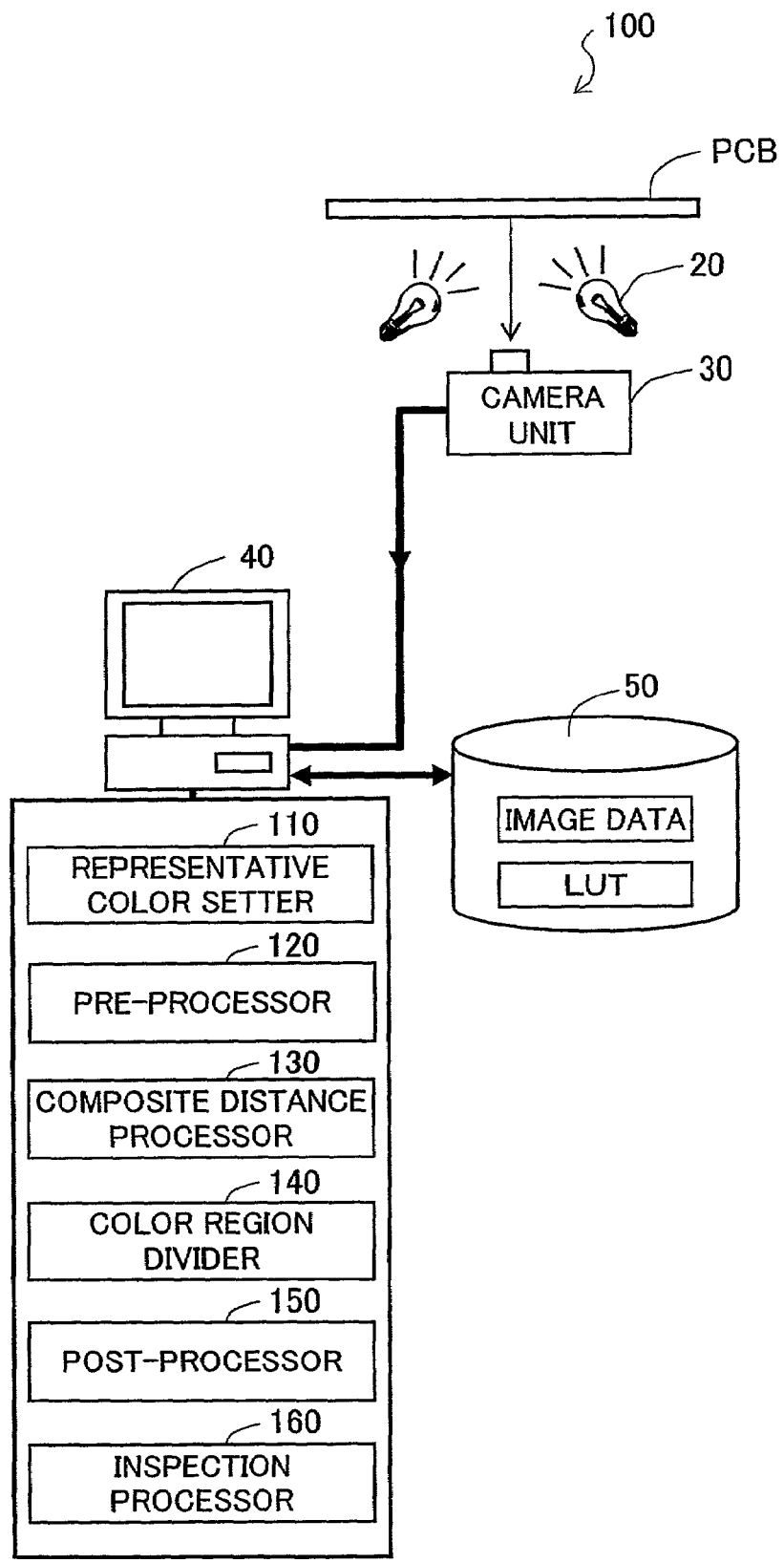
FIG. 1 shows the configuration of a printed circuit board inspection apparatus as one embodiment of the present invention.

Modes of implementation of the present invention are described below based on embodiments in the following order.
A. First embodiment
B. Second embodiment
C. Modifications
A. First embodiment FIG. 1 shows the structure of a printed circuit board inspection apparatus as one embodiment of the present invention. The apparatus 100 comprises a light source 20 for illuminating a printed circuit board PCB, a camera unit for capturing an image of the printed circuit board PCB, and a computer 40 for controlling the entire apparatus. The computer 40 is connected with an external storage device 50 for storing various data and computer programs.

The computer 40 has functions of a representative color setter 110, a pre-processor 120, a composite distance processor 130, a color region divider 140, a post-processor 150, and an inspection processor 160. These various functions are implemented with the computer 40 by executing computer programs stored in the external storage device 50. As can be appreciated from the following description, the composite distance processor 130 also functions as an angle index calculator and a distance index calculator.

Figure 2:
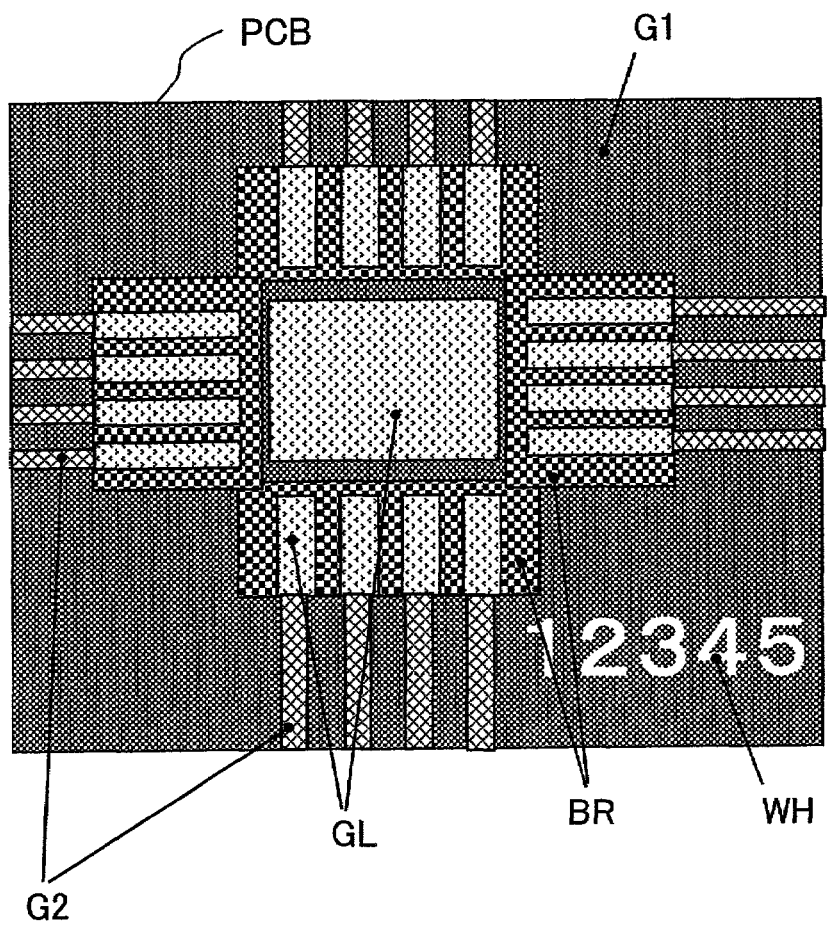
FIG. 2 shows a color image of a printed circuit board PCB.

FIG. 2 shows a color image of a printed circuit board PCB. The surface of the PCB contains a first green region G1 of a board base coated with resist, a second green region G2 of copper wirings coated with resist, a gold region GL plated with gold, a brown region BR of a board base, and a white region WH of a board base printed with white characters. Since the board base underlying the first green region G1 is brown, and the copper wirings underlying the second green region G2 is of copper color, the colors of these two regions G1, G2 are both green but slightly different from each other. Accordingly, these two green regions G1, G2 are referred to as "a green region GR" altogether in this embodiment. In the process described in the following, the two green regions G1, G2 are both considered as a green region GR.

Figure 3:
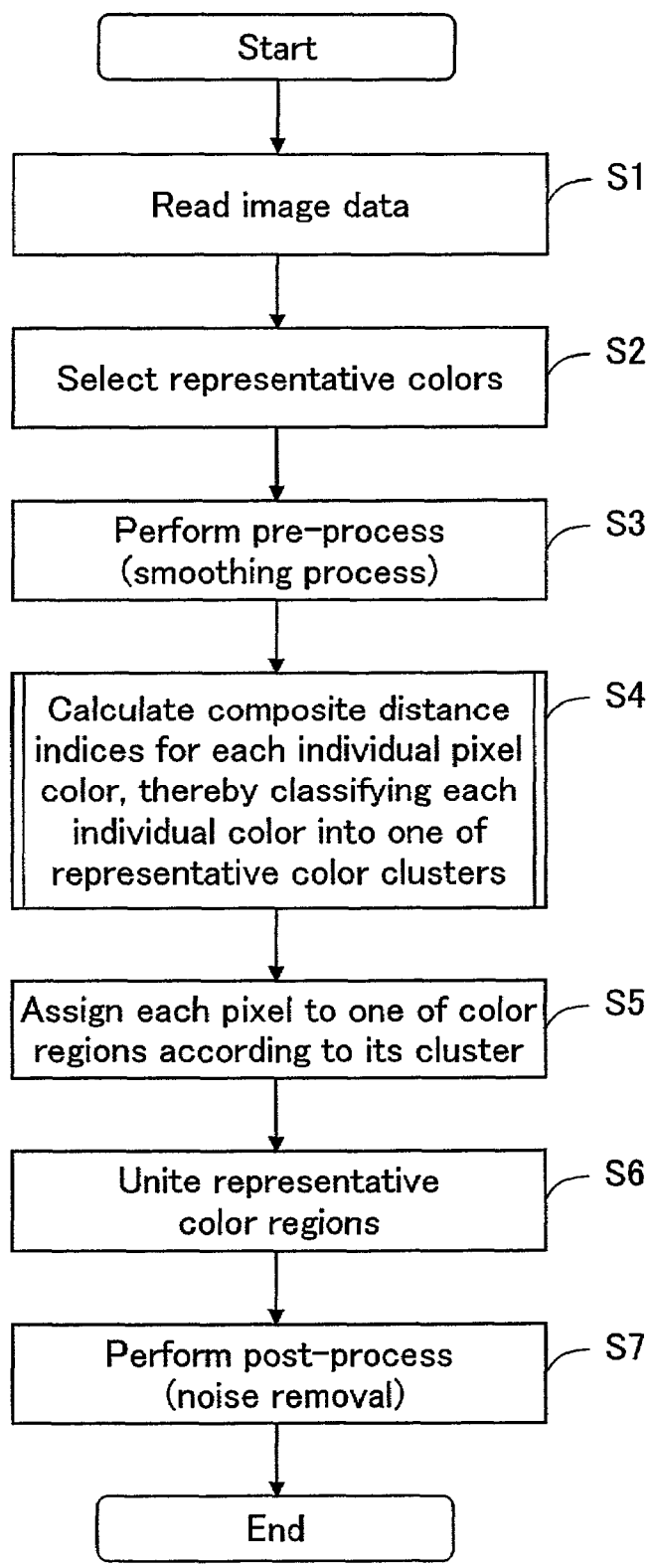
FIG. 3 is a flow chart showing the procedures of region segmentation employed in the embodiments.

FIG. 3 is a flowchart showing the procedures of region segmentation in a first embodiment. At step S1, a color image (FIG. 2) of the printed circuit board PCB is captured by the camera unit 30. If the image data has been captured in advance, the image data is read from the external storage device 50 at step S1.

At step S2, a user observes the color image displayed on a display of the computer 40, and sets a plurality of representative colors by using a pointing device such as mouse. At this time, the representative color setter 110 displays on the display of the computer 40, a predetermined dialog box for the setting process of representative colors, thereby allowing the user to set representative colors.

Figure 4:
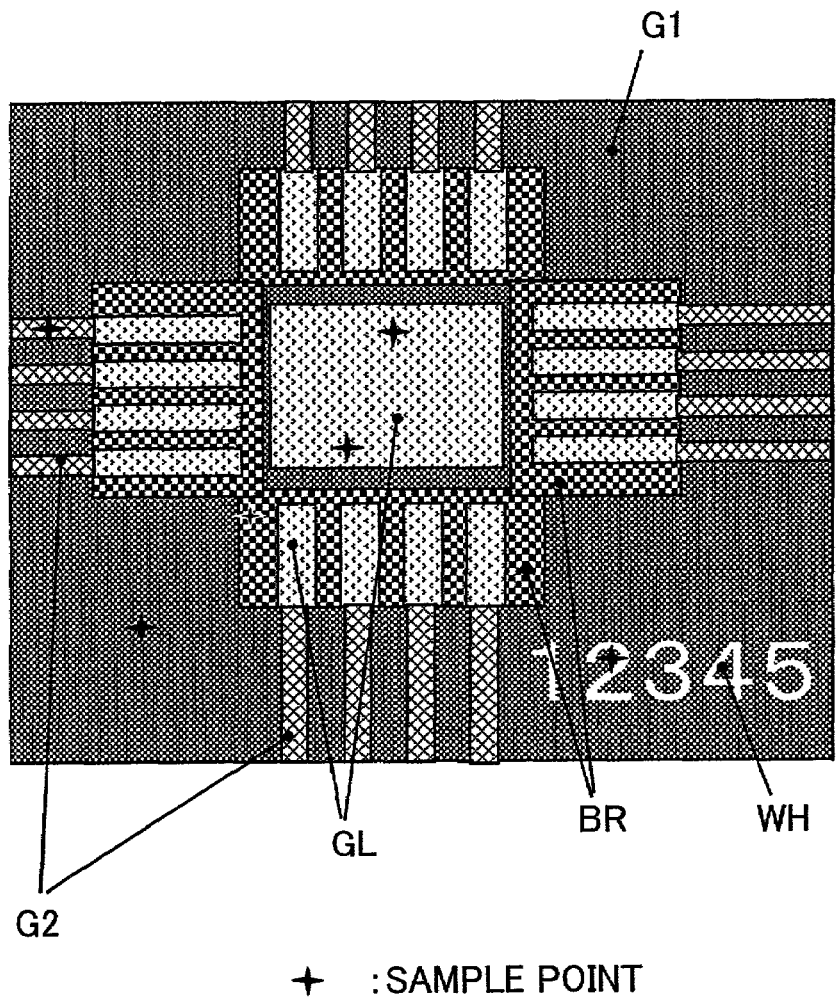
FIG. 4 shows the setting of representative colors.

FIG. 4 shows the process of setting representative colors. The user inputs the names of the four regions GR(G1+G2), GL, BR, WH (e.g., "resist region", "gold plate region" and such) into the dialog box on the display, and specifies sample points (indicated by asterisks) on the color image for obtaining representative colors of each region. At least one sample point is specified for each region. If more than one sample points are specified for one region, the average color of the sample points is employed as the representative color of the region.

The user further specifies whether or not each region is to be united with other region. In the example shown in FIG. 4, a green region GR is specified to make up a first divided region DR1 by itself. A gold region GL and a brown region BR are specified to unite together to make up a divided region DR2, and a white region WH is specified to make up a third divided region DR3 by itself. The representative color setter 110 obtains and registers RGB components of the representative colors of the four regions GR, GL, BR, and WH. Generally, N representative colors are registered where N is an integer of 2 or more.

At step S3 (FIG. 3), the pre-processor 120 (FIG. 1) performs smoothing process (blurring process) on a color image targeted for processing. Various smoothing filters such as median filter, gauss filter, moving average may be used in the smoothing process. By performing the smoothing process, anomalous pixels can be removed from the image data, thereby obtaining an image data with less noise. The pre-processing may be omitted.

Figure 5:
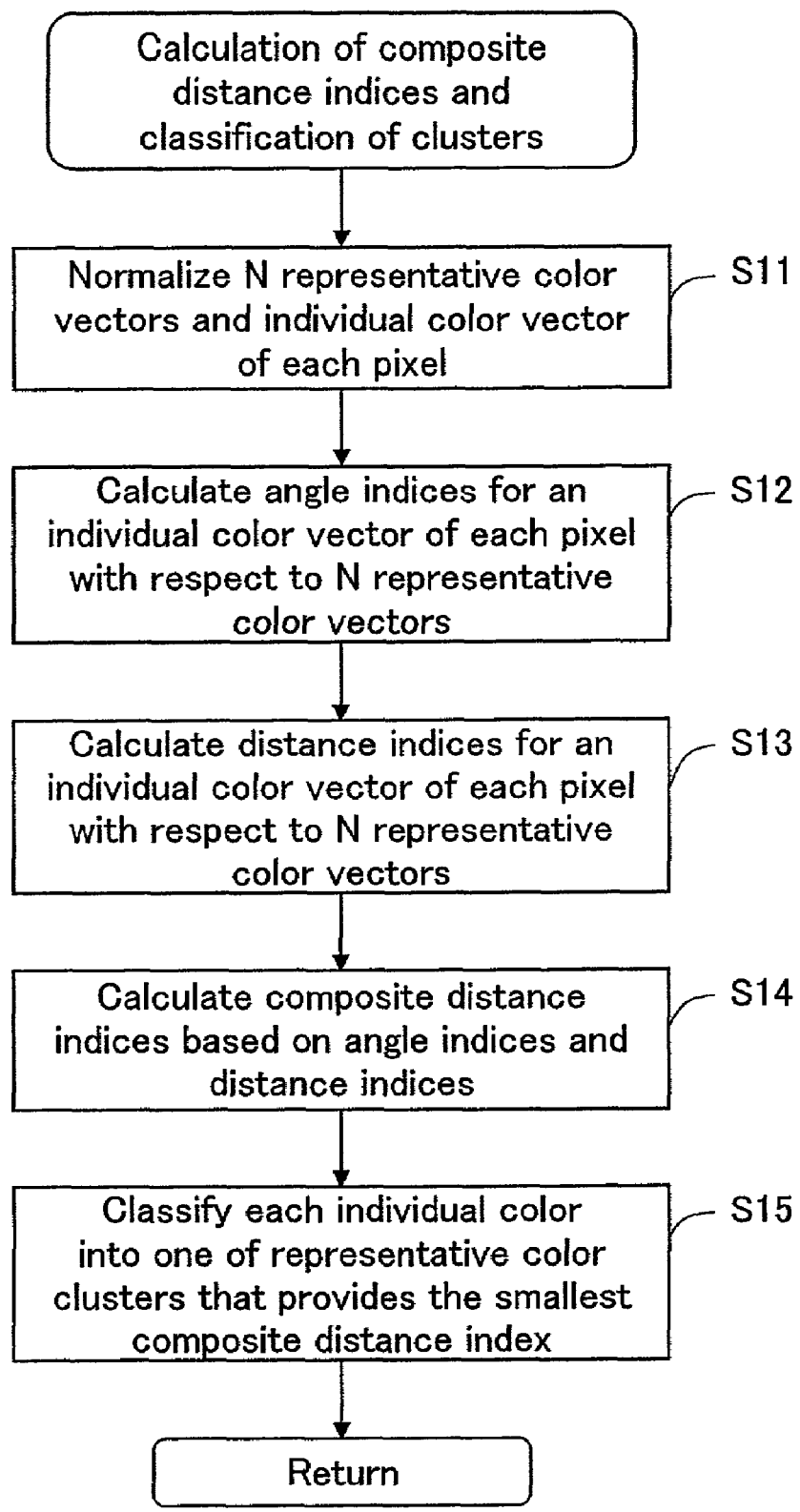
FIG. 5 is a flowchart showing the detailed procedures of step S4 in FIG. 3.

At step S4, the composite distance processor 130 calculates composite distance indices for each pixel color in the color image (referred to as "individual color") with respect to the plural representative colors, and classifies each individual color into one of the representative color clusters. FIG. 5 is a flowchart showing the detailed procedures of step S4. At step S11, representative color vectors of N representative colors (n is an integer of 2 or more) and individual color vectors of individual colors in the color image are normalized. The normalization of the representative color vectors is performed according to the following equations (1a)–(1d).

$$Lref(i) = Rref(i) + Gref(i) + Bref(i) \tag{1a}$$

$$Rvref(i) = Rref(i)/Lref(i) \tag{1b}$$

$$Gvref(i) = Gref(i)/Lref(i) \tag{1c}$$

$$Bvref(i) = Bref(i)/Lref(i) \tag{1d}$$

However, if $Lref(i)=0$,
$Rvref(i) = Gvref(i) = Bvref(i) = 1/3$

Rref(i), Gref(i), and Bref(i) denote R-, G-, and B-components of an i-th (i=1~n) representative color, respectively. Rvref(i), Gvref(i), and Bvref(i) denote normalized R-, G-, and B-components, respectively. In the equation (1a), three color components Rref(i), Gref(i), and Bref(i) are summed together to obtain a value Lref(i) that is to be used for the normalization, and each color component is then normalized by the normalization value Lref(i) in equations (1b)–(1c).

Figure 6:
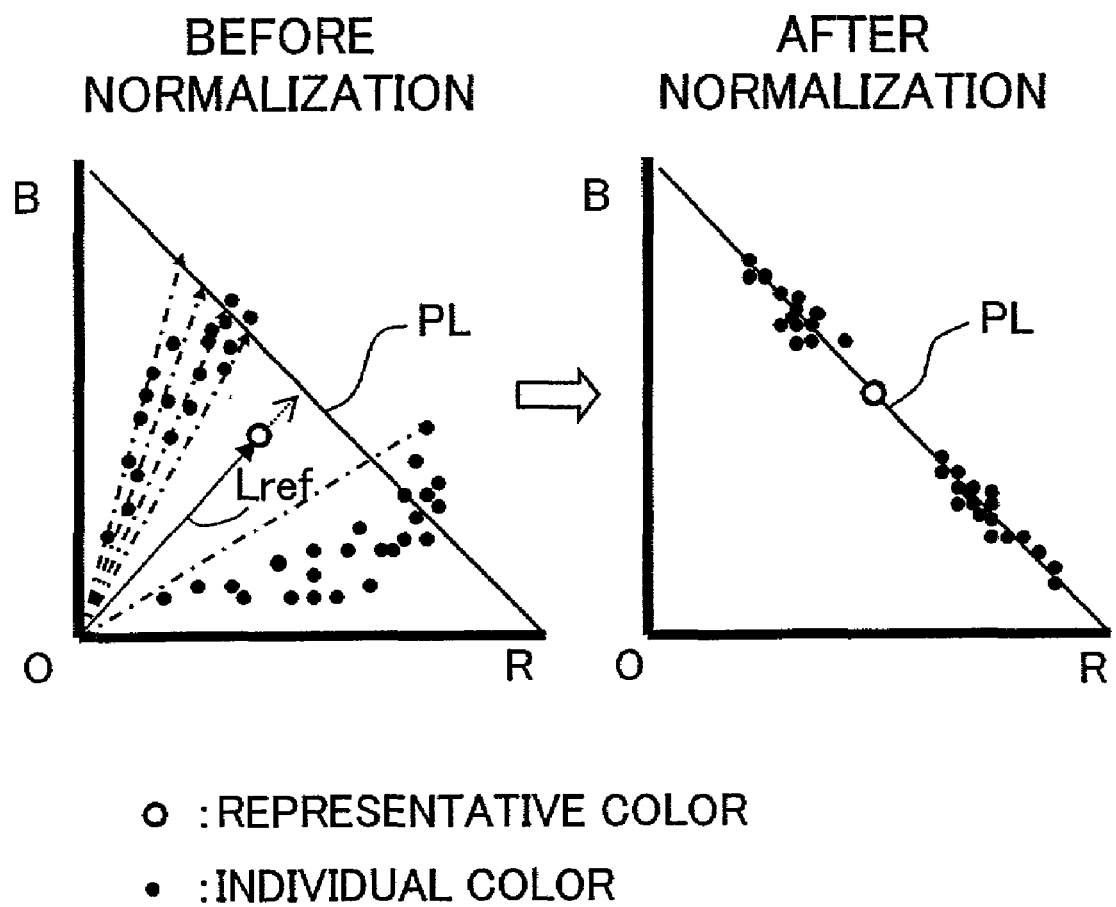
FIGS. 6A and 6B show a color normalization process employed in the first embodiment.

FIGS. 6A and 6B show a color normalization process according to the equations (1a)–(1d). There are plotted an open circle representing a representative color, and black dots representing individual colors in the two-dimensional color space of R and B components. The equations (1a)–(1d) means that the representative color vectors are normalized onto a plane PL defined by the equation: $R+G+B=1$. However, if the representative color is perfectly black (if $Lref(i)=0$), each of the normalized color components Rvref(i), Gvref(i), and Bvref(i) is set to 1/3 instead of using the equations (1b)–(1d). This is to prevent the right sides of the equations (1b)–(1d) from reaching infinite.

Similar to the representative colors, the individual color vectors of pixels are also normalized according to the following equations (2a)–(2d).

$$L(j) = R(j) + G(j) + B(j) \tag{2a}$$

$$Rv(j) = R(j)/L(j) \tag{2b}$$

$$Gv(j)=G(j)/L(j) \quad (2c)$$

$$Bv(j)=B(j)/L(j) \quad (2d)$$

However, if L(j)=0,
Rv(j)=Gv(j)=Bv(j)=⅓

In these equations, j denotes an ordinal number for identifying each pixel in a color image.

In FIG. 6B, the individual colors seem to be dispersing around the plane PL even after the normalization, but this is because of the three-dimensional space is observed from a two-dimensional view. In fact all the normalized individual colors sit on the plane PL.

At step S12 of FIG. 5, an angle index V(i, j) for i-th representative color vector and j-th individual color vector is calculated according to the following equation (3a) or (3b), with respect to N representative color vectors and individual color vectors of individual pixels.

$$V(i,j)=k1*\{|Rv\text{ref}(i)-Rv(j)|+|Gv\text{ref}(i)-Gv(j)|+|Bv\text{ref}(i)-Bv(j)|\} \quad (3a)$$

$$V(i,j)=k1*[\{Rv\text{ref}(i)-Rv(j)\}^2+\{Gv\text{ref}(i)-Gv(j)\}^2+\{Bv\text{ref}(i)-Bv(j)\}^2] \quad (3b)$$

The first term in the parenthesis on the right hand side of the equation (3a) denotes an absolute value of a difference between the normalized R component Rvref(i) of an i-th representative color and the normalized R component Rv(j) of an individual color of a j-th pixel. The second term and the third term denote corresponding G component and B component, respectively. Furthermore, k1 is a predetermined non-zero coefficient. Accordingly, the right hand side of the equation (3a) correlates closely with a distance between the normalized representative color and the normalized individual color on the plain PL. The equation (3b) employs squares of the differences instead of absolute values of the differences, and directly provides a distance between the normalized representative color and the normalized individual color. An angle between a representative color vector and an individual color vector tends to get smaller as the distance between the corresponding representative color and the individual color on the plane PL gets shorter. The value V(i, j) given by the equation (3a) or (3b) depends on the distance between the representative color and the individual color on the plane PL, and correlates closely with the angle between the corresponding representative color vector and individual color vector. Therefore in the present embodiment, the value V(i, j) given by the equation (3a) or (3b) is used as an angle index substantially representing an angle between a representative color vector and an individual color vector.

As can be appreciated from the equations (3a), (3b), the angle index V(i, j) may be a value given by another equation other than (3a), (3b), as long as it substantially represents an angle between a representative color vector and an individual color vector in the color space.

If the coefficient k1 is 1, the angle index V(i, j) takes a value from 0 to 2. The angle index V(i, j) is calculated for every combination of the individual color vector of each pixel and N representative color vectors.

At step S13, a distance index D(i, j) for i-th representative color vector and j-th individual color vector is calculated according to the following equation (4a) or (4b).

$$D(i,j)=\frac{|R\text{ref}(i)-R(j)|+|G\text{ref}(i)-G(j)|+|B\text{ref}(i)-B(j)|}{k2} \quad (4a)$$

-continued $$D(i,j)=\frac{\sqrt{\{R\text{ref}(i)-R(j)\}^2+\{G\text{ref}(i)-G(j)\}^2+\{B\text{ref}(i)-B(j)\}^2}}{k2} \quad (4b)$$

The first term in the parenthesis on the right hand side of the equation (4a) is an absolute value of a difference between an R component Rref(i) of an i-th representative color before normalization and an R component R(j) of an individual color of a j-th pixel before normalization. The second term and the third term are the corresponding G component and B component, respectively. Additionally, k2 is a predetermined non-zero coefficient. The equation (4b) employs square roots of a sum of squares of differences instead of absolute values of the differences. Unlike the above equations (3a), (3b), the un-normalized values Rref(i), R(j) are used in the equations (4a), (4b). The right hand side of the equation (4a) or (4b) accordingly provides a value corresponding to a distance between a representative color and an individual color that are not normalized. Accordingly, in the present embodiment, the value D(i, j) provided by the equation (4a) or (4b) is used as a distance index that substantially represents a distance between a representative color and an individual color.

As can be appreciated from the equations (4a), (4b), the distance index D(i, j) may be any value given by another equation other than (4a), (4b), as long as it substantially represents a distance between a representative color and an individual color in the color space.

If each color component is 8 bit data and the coefficient k2 is 1, the distance index D(i, j) takes a value from 0 to 765. The distance index D(i, j) is calculated for every combination of the individual color vector of each pixel and N representative color vectors.

At step S14, a composite distance index C(i, j) for i-th representative color vector and j-th individual color vector is calculated according to the following equations (5a) or (5b).

$$C(i,j)=V(i,j)+D(i,j) \quad (5a)$$

$$C(i,j)=V(i,j)*D(i,j) \quad (5b)$$

In the equation (5a), the sum of the angle index V(i, j) and the distance index D(i, j) is employed as the composite distance index C(i, j). In the equation (5b), the product of the angle index V(i, j) and the distance index D(i, j) is employed as the composite distance index C(i, j). Accordingly, the composite distance index C(i, j) given by the equation (5a) or (5b) tends to get smaller as an angle between an individual color vector of a j-th pixel and an i-th representative color vector gets smaller and as a distance between the corresponding individual color and the representative color in the color space gets smaller.

After the composite distance indices C(i, j) regarding the plural representative colors are calculated for each pixel color, each individual pixel color is classified into one of the representative color clusters that provides the smallest composite distance index C(i, j), at step S15. The term "cluster" refers to a group of colors associated with one representative color. Since N composite distance indices C(i, j) are obtained for N representative colors for every pixel, the individual color of each pixel is classified into a representative color cluster that provides the smallest one among the N composite distance indices.

Figure 7:
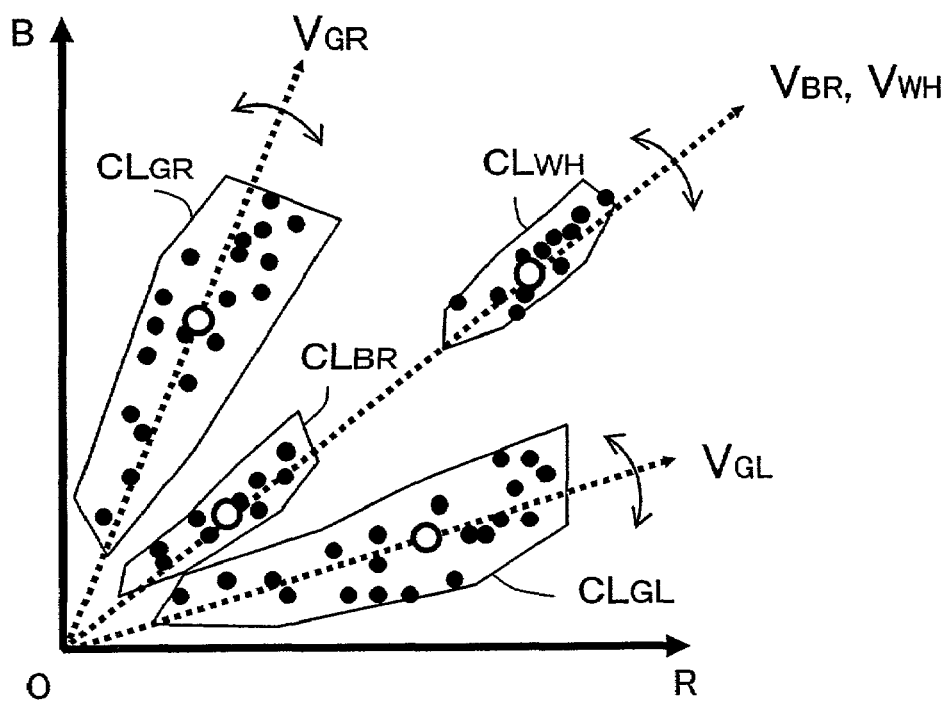
FIG. 7 shows the distribution of individual colors that are grouped into four representative color clusters.
Figure 10A:
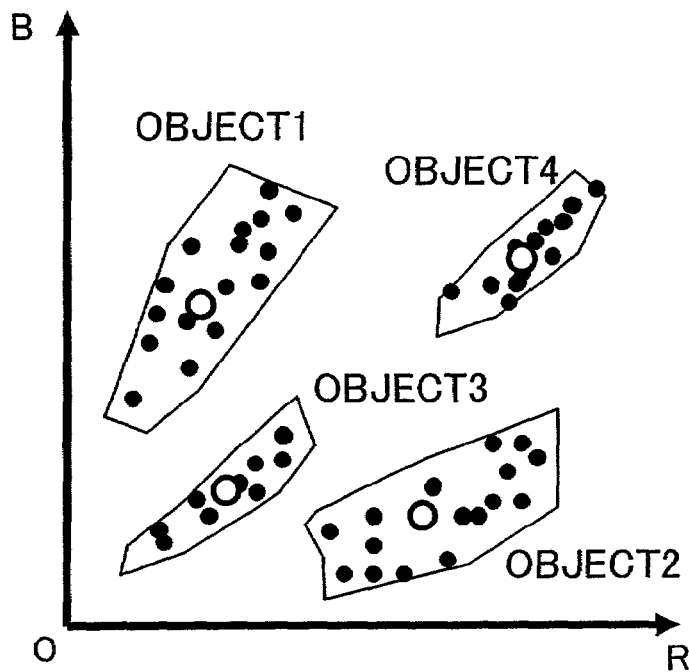
FIGS. 10A and 10B show the result of conventional region segmentation.
Figure 10B:
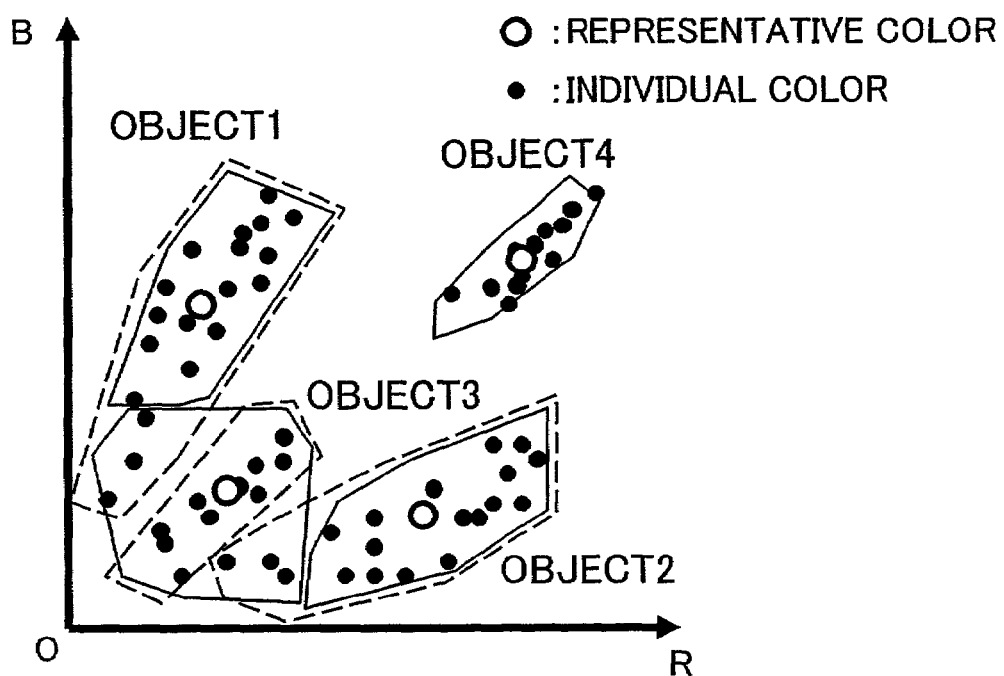

FIG. 7 shows the distribution of individual colors classified into four representative color clusters. As explained with FIG. 4, four representative colors corresponding to four color regions, green region GR, gold region GL, brown region BR, and white region WH, are set at step S2 (FIG. 2). Therefore, in FIG. 7, individual pixel colors are grouped into the representative color clusters $CL_{GR}$, $CL_{GL}$, $CL_{BR}$, and $CL_{WH}$ corresponding to these four colors. In this figure, distances are small between dark individual colors in the gold cluster CLGL (the colors proximate to the origin of the three-dimensional space) and dark individual colors in the brown cluster $CL_{BR}$. However, since the above-described composite distance indices C(i, j) are used in the classification or grouping of individual colors in the present embodiment, each of the individual pixel colors is classified into one of the representative color clusters such that the individual color and the representative color have a small distance between them and also have a small angle between their vectors. Accordingly, it is unlikely that the inappropriate clustering shown in FIG. 10B and described in the background of the invention is performed, but more appropriate clustering is possible.

In this way, after each individual pixel color has been classified into one of the representative color clusters, the color region divider 140 then divides the image region according to the classification of the pixels at step S5 in FIG. 3. For example, the image region is divided by allocating specific numbers (representative color numbers) to the pixels of each cluster. Specifically, pixel values 0, 1, 2, and 3 are allocated to clusters $CL_{GR}$, $CL_{GL}$, $CL_{BR}$, $CL_{WH}$ in FIG. 7, respectively, for example. In the following description, a region allocated with a same representative color number at step S5 is referred to as "a representative color region."

At step S6, the color region divider 140 unites the representative color regions if required. In the present embodiment, the gold region GL and the brown region BR are specified to be united together at step S2, as described with FIG. 4. These regions GL, BR are united together to form a second divided region DR2 at step S5.

FIG. 8 shows the united divided regions displayed on the display of the computer 40. The first to third divided regions DR1–DR3 are displayed with different colors or patterns according to their representative color numbers, respectively. It is previously set by the user how each divided region will be filled on the display according to the representative color number. Alternatively, the color region divider 140 may automatically determine the relationship between each representative color number and the displayed color. As can be appreciated from this example, in the first embodiment, a color image is first divided into a plurality of representative color regions and some of the representative color regions are then united together if required. By employing such process, regions with different colors can be advantageously united into one divided region according to a user's request.

After the image region of the color image is divided into plural divided regions, the post-processor 150 performs post-processing at step S7 in FIG. 3. The post-processing includes a process of noise removal including a choking process (contraction process) of each region and its spreading process (expansion process). The noise removal is attained by executing the choking process with a predetermined pixel width and then the spreading process with the same pixel width for the pixels in a target divided region. Other divided regions can also be applied with the choking and spreading processes. Such post-processing is capable of removing small regions or noises called pin holes.

As described above, in the first embodiment, the composite distance index C(i, j) ix calculated based on the distance index that substantially represents a distance between each individual pixel color and a representative color and on the angle index that substantially represents an angle between each individual color vector and a representative color vector, and then each individual pixel color is classified into one of representative color regions that provides the smallest C(i, j). Accordingly, it is possible to classify pixels with a same original color into a same representative color region even if they have significantly different values of brightness. As a result, regions can be divided more appropriately than in the conventional techniques.

The inspection processor 160 of the printed circuit board inspection apparatus 100 (FIG. 1) compares a reference image of a reference printed circuit board PCB with no defects and a inspection image of a printed circuit board targeted for defect inspection, and to detect specific differences therebetween as defects of the target PCB. It is possible to execute the inspection only on the regions (e.g., gold plate regions) selected by the user as inspection targets, or only on the regions not selected by the user.

B. Second Embodiment

A second embodiment of the present invention is similar to the first embodiment, except for the method for calculating the composite distance index C(i, j).

In the second embodiment, the normalization of individual colors and representative colors is performed by using the following equations (6a)–(6d) and (7a)–(7d) instead of the above equations (1a)–(1d) and (2a)–(2d).

$$Lref(i) = \sqrt{Rref(i)^2 + Gref(i)^2 + Bref(i)^2} \quad (6a)$$

$$Rvref(i) = Rref(i)/Lref(i) \quad (6b)$$

$$Gvref(i) = Gref(i)/Lref(i) \quad (6c)$$

$$Bvref(i) = Bref(i)/Lref(i) \quad (6d)$$

However, if $Lref(i)=0$,
$Rvref(i)=Gvref(i)=Bvref(i)=1/\sqrt{3}$ $$L(j) = \sqrt{R(j)^2 + G(j)^2 + B(j)^2} \quad (7a)$$

$$Rv(j) = R(j)/L(j) \quad (7b)$$

$$Gv(j) = G(j)/L(j) \quad (7c)$$

$$Bv(j) = B(j)/L(j) \quad (7d)$$

However, if $L(j)=0$,
$Rv(j)=Gv(j)=Bv(j)=1/\sqrt{3}$

FIGS. 9A and 9B show a color normalization process employed in the second embodiment. The equations (6a)–(6d) and (7a)–(7d) implies that individual colors and representative colors are normalized onto dots on a spherical surface of a radius 1. However, if the representative color is perfectly black (if Lref(i)=0), each of the normalized color components Rvref(i), Gvref(i), and Bvref(i) is set to $1\sqrt{3}$.

By normalizing representative colors and individual colors onto dots on a spherical surface SP of radius 1, the second embodiment can attain substantially the same effects attained as the first embodiment. The color normalization is intended to facilitate the operations for obtaining angles between each individual color vector and the representative color vectors. Accordingly, if other methods are employed to obtain angles between vectors, such as a method using inner products of vectors, such normalization is not required. However, operation speeds can be advantageously improved by performing color normalization stated above.

C. Modifications

C1. Modification 1

Although the RGB space has been employed as a color space in the above embodiments, other various color spaces are also applicable to the present invention. For example, three-dimensional color space such as L*a*b*, and two-dimensional color space defined by two basic colors are also applicable. In other words, any color space of two or more dimensions is generally applicable to the present invention.

C2. Modification 2

In region dividing process, composite distance indices for the N representative colors may be calculated in advance with respect to arbitrary colors in the color space, and the calculation results may be formed into a lookup table LUT (FIG. 1), instead of actually calculating composite distance indices for each individual pixel color in the target color image. Alternatively, the correspondence between arbitrary colors in the color space and plural representative colors may be determined and formed into a lookup table LUT. In these cases, the composite distance processor 130 functions as a lookup table generator. In the actual region dividing process, the composite distance processor 140 makes reference to the lookup table LUT, so that the region dividing or region segmentation can be performed with high speed. This advantage is particularly significant when the target color image is of a large size or a plurality of target color images are processed. For example, if a lookup table LUT is employed in the printed circuit board inspection apparatus 100, not only the reference image but also the target image or inspection image can also be divided into color regions by making reference to the lookup table LUT.

It is preferable that the lookup table LUT has any arbitrary color in the color space as input and a representative color number representing one of plural representative colors as output. These representative color numbers do not represent color components such as RGB pixel values, but represent identification numbers discriminable from one another, such as 0, 1, and 2.

In order to reduce the capacity of the lookup table LUT, one or more lower bits may be omitted from plural bits of each input color data (pixel value data). In this case, colors with same bits except for the omitted lower bits will be considered as a same color and will be related with a same representative color. The preparation time of the lookup table LUT and the amount of data can thus be reduced dramatically. For an image supposed to have substantial amount of noise components, such as an image picked up by CCD camera, the region segmentation according to colors may possibly be performed with less errors by employing such lookup table LUT with reduced bit numbers.

C3. Modification 3

If each color component of the image data is expressed in 8 bits, it is preferable to replace the normalization terms 1/Lref(i), 1/L(j) in the above equations (1b)–(1d) and (2b)–(2d) with 765/Lref(i), 765/L(j), respectively. This makes the range of each normalized color component to be from 0 to 255, and the subsequent operations may be performed with integers, thereby improving the operation speed of the software. The value of each normalized color component is set to 255 if Lref(i)=0 and L(j)=0.

C4. Modification 4

The result of region segmentation may be output onto a display or a printed medium, or may be used for various applications. For example, an original color image may be displayed on the display device of the computer 40. When specified an arbitrary location on the display by the user, the apparatus can make reference to the results of the image region segmentation shown in FIG. 8, and notify the user of the divided region to which the specified location belongs. Specifically, when the user uses a mouse and clicks a location in a green region GR, a notice "this is resist" can be displayed. The user can thus be notified of the correspondence between the original objects and arbitrary locations on the picture image displayed on the display device.

At least one representative color region (or divided region) obtained by the region segmentation may be employed as a mask that represents a region targeted or not targeted for some image processing. For example, the first divided region DRI shown in FIG. 8 may be used as a mask to selectively perform a predetermined image processing in the mask region.

C5. Modification 5

In the above embodiments, the color of the user-specified location on the targeted color image has been determined as a representative color, but other various methods may also be employed to set representative colors, such as those disclosed in Japanese Patents 2,896,319 and 2,896,320, the disclosures of which are hereby incorporated by reference for all purposes. For example, as disclosed in Japanese Patent 2,896,319, a histogram of the image may be prepared to determine a color of high frequency as a representative color. Alternatively, a color patch may be displayed to allow the user to select a representative color among them, as disclosed in Japanese Patent 2,896,320.

Although in the above embodiments a final representative color has been determined based on the color of the user-specified location, it is also possible to re-calculate the representative color according to the cluster grouping results (FIG. 7) for the individual colors. That is, if the grouping result is obtained as shown in FIG. 7, the center of gravity of plural colors in each cluster (a group of colors that belong to a same representative color cluster) may then be determined as its representative color. The cluster grouping may then be performed once more by using this new representative color. However, as in the above embodiments, processing speeds will be greater by determining the final representative color based on the color of the user-specified location and then by performing the cluster grouping just once.

C6. Modification 6

In each of the above embodiments, a black reference point has been employed as the origin of color vectors, but a white reference point may also be employed. For example, if region segmentation is desired to divide a printed matter containing plural single color gradations into plural regions printed with each ink, it may sometimes be preferable to set the origin of color vectors to a white reference point.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for dividing an image region of a color image according to colors, comprising the steps of:
   (a) setting a plurality of representative colors;
   (b) calculating plural angle indices for each pixel color in the color image, the plural angle indices for a pixel color representing angles between an individual color vector of the pixel color and representative color vectors of the plurality of representative color vectors in a predetermined color space of at least two dimensions;

(c) calculating plural distance indices for each pixel color in the color image, the plural distance indices for a pixel color representing distances between the pixel color and the plural representative colors in the color space;

(d) calculating plural composite distance indices for each pixel color in the color image based on the distance indices and the angle indices, the plural composite distance indices being associated with the plurality of representative colors, respectively; and (e) classifying pixels in the color image into plural representative color regions associated with the plural representative colors, according to the composite distance indices, thereby dividing the image region of the color image into the plural representative color regions.

2. A method in accordance with claim 1, wherein each composite distance index includes a sum of an angle index and a corresponding distance index.

3. A method in accordance with claim 1, wherein each composite distance index includes a product of an angle index and a corresponding distance index.

4. A method in accordance with claim 1, wherein the step (e) includes the step of assigning each pixel to one of the plural representative color regions that gives a minimum value of the composite distance indices.

5. A method for dividing an image region of a color image according to colors, comprising the steps of:

(a) setting a plurality of representative colors;

(b) calculating plural angle indices for each arbitrary individual color in the color space, the angle indices for an arbitrary individual color representing angles between an individual color vector of the arbitrary individual color and representative color vectors of the plurality of representative colors in a predetermined color space of at least two dimensions;

(c) calculating distance indices for each arbitrary individual color in the color space, the distance indices for an arbitrary individual color representing distances between the arbitrary individual color and the plural representative colors in the color space;

(d) calculating composite distance indices for each arbitrary individual color in the color space based on the distance indices and the angle indices, the plural composite distance indices being associated with the plurality of representative colors, respectively;

(e) relating each arbitrary individual color in the color space with one of the plural representative colors according to the composite distance indices, and preparing a lookup table storing the correspondence between each arbitrary individual color and the plural representative colors; and (f) classifying pixels in the color image into plural representative color regions associated with the plural representative colors, with the aid of the lookup table, thereby dividing the image region of the color image into the plural representative color regions.

6. A method in accordance with claim 5, wherein each composite distance index includes a sum of an angle index and a corresponding distance index.

7. A method in accordance with claim 5, wherein each composite distance. index includes a product of an angle index and a corresponding distance index.

8. A method in accordance with claim 5, wherein the step (e) includes the step of relating each arbitrary individual color to one of the plural representative colors that gives a minimum value of the composite distance indices.

9. An apparatus for dividing an image region of a color image according to colors, comprising:

a representative color setter configured to set a plurality of representative colors;

an angle index calculator configured to calculate plural angle indices for each pixel color in the color image, the plural angle indices for a pixel color representing angles between an individual color vector of the pixel color and representative color vectors of the plurality of representative colors in a predetermined color space of at least two dimensions;

a distance index calculator configured to calculate plural distance indices for each pixel color in the color image, the plural distance indices for a pixel color representing distances between the pixel color and the plural representative colors in the color space;

a composite distance processor configured to calculate plural composite distance indices for each pixel color in the color image based on the distance indices and the angle indices, the plural composite distance indices being associated with the plurality of representative colors, respectively; and a color region divider configured to classify pixels in the color image into plural representative color regions associated with the plural representative colors according to the composite distance indices, thereby dividing the image region of the color image into the plural representative color regions.

10. An apparatus in accordance with claim 9, wherein each composite distance index includes a sum of an angle index and a corresponding distance index.

11. An apparatus in accordance with claim 9, wherein each composite distance index includes a product of an angle index and a corresponding distance index.

12. An apparatus in accordance with claim 9, wherein the color region divider assigns each pixel to one of the plural representative color regions that gives a minimum value of the composite distance indices.

13. A method for inspecting a circuit board, comprising the steps of:

(a) capturing a color image of the circuit board;

(b) setting a plurality of representative colors;

(c) calculating plural angle indices for each pixel color in the color image, the plural angle indices for a pixel color representing angles between an individual color vector of the pixel color and representative color vectors of the plurality of representative color vectors in a predetermined color space of at least two dimensions;

(d) calculating plural distance indices for each pixel color in the color image, the plural distance indices for a pixel color representing distances between the pixel color and the plural representative colors in the color space;

(e) calculating plural composite distance indices for each pixel color in the color image based on the distance indices and the angle indices, the plural composite distance indices being associated with the plurality of representative colors, respectively;

(f) classifying pixels in the color image into plural representative color regions associated with the plural representative colors, according to the composite distance indices, thereby dividing an image region of the color image into the plural representative color regions; and (g) performing inspection of the circuit board using at least one of the divided plural representative color regions.

14. A method in accordance with claim 13, wherein each composite distance index includes a sum of an angle index and a corresponding distance index.

15. A method in accordance with claim 13, wherein each composite distance index includes a product of an angle index and a corresponding distance index.

16. A method in accordance with claim 13, wherein the step (f) includes the step of assigning each pixel to one of the plural representative color regions that gives a minimum value of the composite distance indices.

17. A method for inspecting a circuit board, comprising the steps of:
- (a) setting a plurality of representative colors;
- (b) calculating plural angle indices for each arbitrary individual color in the color space, the angle indices for an arbitrary individual color representing angles between an individual color vector of the arbitrary individual color and representative color vectors of the plurality of representative colors in a predetermined color space of at least two dimensions;
- (c) calculating distance indices for each arbitrary individual color in the color space, the distance indices for an arbitrary individual color representing distances between the arbitrary individual color and the plural representative colors in the color space;
- (d) calculating composite distance indices for each arbitrary individual color in the color space based on the distance indices and the angle indices, the plural composite distance indices being associated with the plurality of representative colors, respectively;
- (e) relating each arbitrary individual color in the color space with one of the plural representative colors according to the composite distance indices, and preparing a lookup table storing the correspondence between each arbitrary individual color and the plural representative colors;
- (f) capturing a color image of the circuit board;
- (g) classifying pixels in the color image into plural representative color regions associated with the plural representative colors, with the aid of the lookup table, thereby dividing an image region of the color image into the plural representative color regions; and
- (h) performing inspection of the circuit board using at least one of the divided plural representative color regions.

18. A method in accordance with claim 17, wherein each composite distance index includes a sum of an angle index and a corresponding distance index.

19. A method in accordance with claim 17, wherein each composite distance index includes a product of an angle index and a corresponding distance index.

20. A method in accordance with claim 17, wherein the step (e) includes the step of relating each arbitrary individual color to one of the plural representative colors that gives a minimum value of the composite distance indices.

* * * * *